Sept. 14, 1965  H. W. STIER  3,205,558
CUTTING TOOL WITH REMOVABLE THROW-AWAY INSERT
Filed Jan. 27, 1964
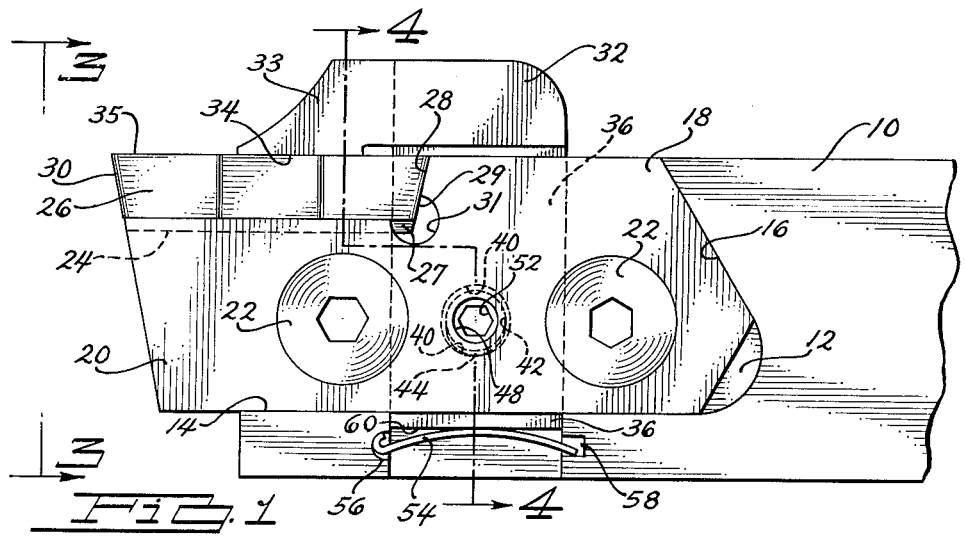
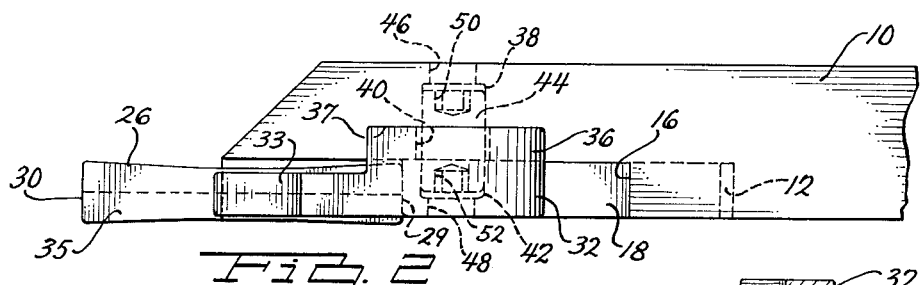
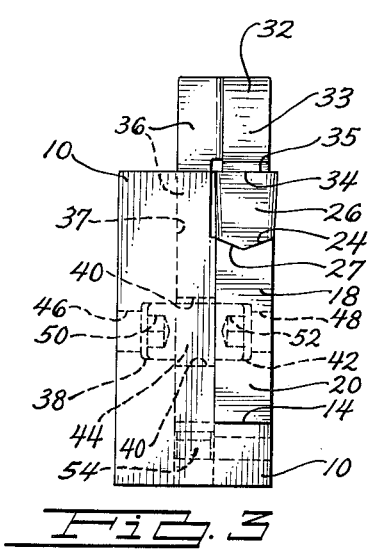
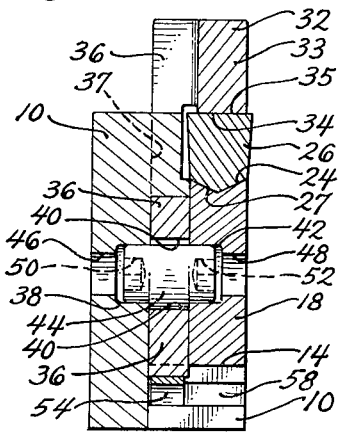
INVENTOR.
HENRY W. STIER
BY
Bower & Patalidis
ATTORNEYS

United States Patent Office 3,205,558
Patented Sept. 14, 1965

3,205,558
CUTTING TOOL WITH REMOVABLE THROW-AWAY INSERT
Henry W. Stier, Dearborn Heights, Mich., assignor to Willey's Carbide Tool Company, Detroit, Mich.
Filed Jan. 27, 1964, Ser. No. 340,406
4 Claims. (Cl. 29—96)

This invention relates to improvements in a cutting tool and more particularly to a type of cutting tool having a removable and indexable cutting insert made of carbides or similar hard materials.

The advantages of cutting tools having a removable and indexable cutting insert, such as, for example, cutting tools which are used in automatic screw machines and metal lathes, are well known to those skilled in the art. In such cutting tools, the cutting insert is held in position in a recess or pocket in a shank or holder which is adapted to be mounted on the tool post of the machine. A variety of arrangements is used to securedly maintain the cutting insert in the recess or pocket, such as set screws, clamps, eccentric cams, and the like.

The principal object of the invention is to provide a cutting tool, so that the cutting insert can be quickly and easily released when a cutting edge is worn so as to index it to another position presenting a sharp cutting edge to the work, or to replace it by a new insert when all the cutting edges are worn.

Another object of the invention is to provide a cutting tool having a replaceable and indexable cutting insert held in position in the holder portion of the tool by means of a clamp which requires only a simple manipulation for clamping and unclamping of the insert.

A further object of the invention is to provide a cutting tool adapted to afford a strong and rigid support for a substantially slender cutting insert such as is generally used in deep groove forming and in cut-off tools.

Other objects and advantages of the invention will become apparent from the following specification and accompanying drawings wherein:

FIGURE 1 is a side elevation view of an example of a cutting tool embodying the invention;

FIGURE 2 is a top plan view of the tool of FIGURE 1;

FIGURE 3 is an end view of the tool, as seen from line 3—3 of FIGURE 1; and

FIGURE 4 is a sectional view taken on line 4—4 of FIGURE 1.

The tool of the invention comprises a parallelepipedonal shank 10, adapted to be normally mounted on the tool post of a machine, which is provided with a portion removed from one end so as to form a recess 12 on one side thereof, the recess being open at the top and on the front, as seen in FIGURE 1, so as to present a support wall 14 along its bottom edge and a rear abutment wall 16.

A support plate 18, which is longer than the recess so as to project therefrom, is snuggly disposed in the recess 12, with two sides engaging the support wall 14 and the rear abutment wall 16, and with an overhanging portion 20 projecting from the open end of the recess. The walls 14 and 16 provide a strong support for the support plate 18 which is secured to the shank 10, for example, by means of mounting screws such as 22.

A cut-out portion along the upper edge of the support plate 18 affords a transversely V-shaped concave-like seating surface 24 for an elongated cutting insert 26, preferably made of carbide or the like. The cutting insert 26 has a V-shaped convex-like bottom surface 27 engaging the seating surface 24 to insure proper lateral indexing of the cutting insert 26.

The support plate cut-out portion is also provided with a back wall 28 inclined at an angle corresponding to the inclination of the cutting insert end faces 29 and 30. A relief notch 31, at the junction of the back wall 28 and the seating surface 24, prevents dirt or chips from interfering with proper seating of the insert.

The cutting insert 26 is held in position by a clamp 32. The clamp 32 is provided with a laterally off-set clamping head or finger 33 having a clamping surface 34 which engages the top surface 35 of the cutting insert 26 and secures the cutting insert in place. The clamp 32 is also provided with a body portion 36 which is disposed substantially at right angle to the clamping head 33. The body portion 36 of the clamp 32 slidably fits in a channel 37, disposed vertically in the shank 10, as seen in the drawings, behind the support plate 18.

Aligned transverse bores 38, 40 and 42 are disposed in the shank 10, clamp body 36 and support plate 18, respectively. An eccentric camming member 44, having one of its ends journalled in the bore 38 and its other end journalled in the bore 42, is adapted to engage the bore 40 of the clamp body 36 and to urge it either up or down, as seen in the drawings, according to the direction of rotation of said camming member, until the camming member reaches a self locking down position securedly holding the insert 26 firmly in place due to the clamping pressure exerted by the clamping head or finger 22. Access holes 46 and 48 are provided respectively in the shank 10 and the plate 18 to afford a passage for a wrench (not shown) having a hexagonal or square end capable of fitting the corresponding sockets 50 and 52 in both ends of the camming member 44, for operation thereof.

A bowed spring member 54, mounted in slots 56 and 58 in the shank 10 and engaging the end face 60 of the clamp body 36, urges the clamp body in the direction that tends to cause the clamping surface 34 of the clamping head 33 to disengage the upper face 35 of the cutting insert 26, when the camming member 44 is rotated to its unlocked position.

It is evident that the invention shown and described herein is susceptible of variations without departing from the spirit and scope of the invention.

Having thus described the invention what is claimed as new and desired to be secured by Letters Patent is:

1. A cutting tool comprising: a shank adapted to be mounted on the tool post of a machine, one end of said shank being provided with a recess open at the top, on the front and on one side and having a bottom wall; a plate member adapted to be disposed in said recess and having a bottom face engaging the bottom wall of said recess, said plate member being provided with an overhanging portion projecting through the front of said recess; means securing said plate member in said recess; a cut-out portion disposed in the upper front corner of said plate member, said cut-out portion forming a bottom surface defining a longitudinally disposed V-shaped seating surface and a rearwardly disposed wall; a cutting insert having a V-shaped bottom surface conforming to the shape of said seating surface so as to engage said seating surface for proper lateral indexing of said cutting insert relatively to said seating surface with the rear edge of said cutting insert normally abutting against the rearwardly disposed wall of said cut-out portion so as to provide longitudinal indexing of said cutting insert; a releasable clamping member having a clamping finger overhanging the cut-out portion of said plate member and engaging the upper face of said cutting insert and a body slidably mounted in a channel disposed alongside said recess; and means for forcing said finger toward the bottom of said cut-out portion to exert a clamping pressure on the cutting insert to hold said insert properly seated on the seating surface of said cut-out portion, said means comprising an eccentric camming member in bores disposed substantially in aligned spatial arrangement in said plate member, in the body of the clamping member and in the shank, whereby when said camming member is rotated in a first direction said clamping finger engages the upper face of said cutting insert and when said camming member is rotated in a second direction said clamping finger is backed away from said upper face.

2. The cutting tool of claim 1 wherein biasing means are provided for urging the clamping member away from the upper face of the cutting insert when the eccentric camming member is rotated in said second direction.

3. A cutting tool comprising: a shank adapted to be mounted on the tool post of a machine, one end of said shank being provided with a recess open at the top, on the front and on one side; a plate member adapted to be disposed in said recess and provided with an overhanging portion projecting through the front of said recess; means securing said plate member in said recess; a cut-out portion disposed in the upper front corner of said plate member, said cut-out portion forming a bottom surface defining a longitudinally disposed seating surface and a rearwardly disposed wall; a cutting insert having a bottom surface engaging said seating surface with the rear edge of said cutting insert normally abutting against the rearwardly disposed wall of said cut-out portion so as to provide longitudinal indexing of said cutting insert; a releasable clamping member adapted to engage the upper face of said cutting insert and having a body slidably mounted in a channel disposed alongside said recess; and means for forcing said clamping member toward the bottom of said cut-out portion to exert a clamping pressure on the cutting insert to hold said insert properly seated on the seating surface of said cut-out portion, said means comprising an eccentric camming member in bores disposed substantaily in aligned spatial arrangement in said plate member, in the body of the clamping member and in the shank, whereby when said camming member is rotated in a first direction said clamping finger engages the upper face of said cutting insert and when said camming member is rotated in a second direction said clamping finger is backed away from said upper face.

4. The cutting tool of claim 3 wherein biasing means are provided for urging the clamping member away from the upper face of the cutting insert when the eccentric camming member is rotated in said second direction.

References Cited by the Examiner

UNITED STATES PATENTS 3,125,798　3/64　Stein ------------------ 29—96

WILLIAM W. DYER, Jr., *Primary Examiner.*